US009858520B2

(12) United States Patent
Holostov et al.

(10) Patent No.: US 9,858,520 B2
(45) Date of Patent: Jan. 2, 2018

(54) CONTROLLABLE MARKING (71) Applicant: Microsoft Technology Licensing, LLC, Redmond, WA (US)

(72) Inventors: Vladimir Holostov, Sammamish, WA (US); Austin Czarnecki, Seattle, WA (US); Julia Meinershagen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/859,535

(22) Filed: Sep. 21, 2015

(65) Prior Publication Data
US 2017/0083806 A1    Mar. 23, 2017

(51) Int. Cl.
G02F 1/163    (2006.01)
G06K 19/077    (2006.01)
G02F 1/15    (2006.01)
G09G 3/00    (2006.01)
G06F 1/16    (2006.01)

(52) U.S. Cl.
CPC ....... G06K 19/07705 (2013.01); G02F 1/163 (2013.01); G06F 1/1601 (2013.01); G06K 19/07707 (2013.01); G09G 3/001 (2013.01); G09G 2380/04 (2013.01)

(58) Field of Classification Search
CPC ....... G06K 19/07703; G06K 19/07705; G06K 19/07707; G09G 3/001; G09G 3/16; G09G 3/18; G09G 3/19; G09G 2380/04; G02F 1/15; G02F 1/167
See application file for complete search history.

(56) References Cited

U.S. PATENT DOCUMENTS

| 5,673,028 A * | 9/1997 | Levy ............... G01D 7/005 116/209 |
| 5,721,597 A * | 2/1998 | Kakinuma ........ G02F 1/1334 345/95 |
| 5,764,401 A * | 6/1998 | Udaka ............. G02F 1/1506 359/270 |
| 6,270,122 B1 * | 8/2001 | Shadle .............. B44C 1/145 116/206 |

(Continued)

FOREIGN PATENT DOCUMENTS

EP    0683141 A1    11/1995

OTHER PUBLICATIONS

Han et al., "Electrochemical Patterning of Transparent Single-Walled Carbon Nanotube Films on Plastic Substrates", Article in Langmuir, Mar. 2010, pp. 9136-9141.

(Continued)

Primary Examiner — Suezu Ellis
(74) Attorney, Agent, or Firm — Rainier Patents, P.S.

(57) ABSTRACT

The description relates to controllable device marking. One example can be manifest as a device that has a housing and a marking apparatus integrated into the housing. The marking apparatus can include a display and a disablement mechanism. While the disablement mechanism is in a first state the display is controllable to allow content presented on the display to be defined and when the disablement mechanism is transitioned to a second state the content is persisted and unchangeable on the display.

24 Claims, 10 Drawing Sheets

(56) References Cited

U.S. PATENT DOCUMENTS

| | | | |
|---|---|---|---|
| 6,285,492 B1* | 9/2001 | Good | H01M 6/30 359/297 |
| 7,088,355 B1* | 8/2006 | Ochi | G09G 3/3611 345/211 |
| 7,478,492 B2 | 1/2009 | Madonia | |
| 8,455,872 B2 | 6/2013 | French | |
| 8,559,052 B2 | 10/2013 | Jacob | |
| 2004/0207899 A1* | 10/2004 | Udaka | G02F 1/1508 359/265 |
| 2006/0145865 A1* | 7/2006 | Forster | G06K 19/0723 340/572.8 |
| 2006/0158756 A1 | 7/2006 | Hay | |
| 2006/0209383 A1* | 9/2006 | Burdis | G02F 1/1523 359/265 |
| 2008/0120392 A1* | 5/2008 | Dillon | B60Q 1/503 709/208 |
| 2009/0288317 A1 | 11/2009 | Forbes | |
| 2010/0085624 A1* | 4/2010 | Lee | G09G 3/38 359/265 |
| 2010/0202040 A1 | 8/2010 | Morgan | |
| 2011/0063709 A1* | 3/2011 | Kanitz | C09K 9/02 359/273 |
| 2011/0096388 A1 | 4/2011 | Agrawal et al. | |
| 2011/0304903 A1* | 12/2011 | Jun | G02F 1/167 359/296 |
| 2014/0091052 A1 | 4/2014 | Nagashima | |
| 2015/0084966 A1 | 3/2015 | Sood | |
| 2015/0097769 A1* | 4/2015 | Russell | G06F 1/1652 345/156 |
| 2015/0168223 A1* | 6/2015 | Hammond | G01K 1/028 702/130 |

OTHER PUBLICATIONS

"Multipurpose led clock programmable scrolling text message led display panel", retrieved on Jun. 16, 2015 from <<http://jiapuled.en.alibaba.com/product/60065987443-210830016/multipurpose_led_clock_programmable_scrolling_text_message_led_display_panel.html>>, 11 pages.

Hekmatshoar et al, "Highly stable amorphous-silicon thin-film transistors on clear plastic", Applied Physics Letter, vol. 93, Jul. 23, 2008, 3 pages.

Padilla, Richard, "President Obama Signs E-Label Act, Companies No Longer Required to Etch FCC Labels on Devices", Published on Nov. 26, 2014, retrieved from <<http://www.macrumors.com/2014/11/27/president-obama-elabel-act-fcc-devices/>> on Jun. 15, 2015, 8 pages.

"Phone, laptop and other device engraving guidelines", Published on Nov. 25, 2014, retrieved from <<http://www.cutlasercut.com/resources/tips-and-advice/phone-laptop-other-device-engraving-guidelines>> on Jun. 15, 2015, 5 pages.

Savastano, David, "MpicoSys' Focus on Customers' Needs Drives Success in Field of Miniature Electronic Devices", Published on: Aug. 2012, retrieved from <<http://shows.printedelectronicsnow.com/articles/2012/08/mpicosys-focus-on-customers-needs-drives-success>> on Jun. 15, 2015, 4 pages.

International Search Report and Written Opinion dated Nov. 11, 2016 from PCT Patent Application No. PCT/US2016/047114, 11 pages.

Article 34 Amendment filed Jun. 29, 2017 to the International Search Report and Written Opinion dated Nov. 11, 2016 from PCT Patent Application No. PCT/US2016/047114, 9 pages.

"Second Written Opinion Issued in PCT Application No. PCT/US2016/047114", dated Aug. 17, 2017, 7 Pages.

* cited by examiner

INSTANCE ONE

INSTANCE TWO

FIG. 1

INSTANCE THREE

INSTANCE FOUR

CONTROLLABLE MARKING

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DESCRIPTION

The present concepts relate to marking devices, such as computer devices. The device marking can be accomplished via a controllable marking apparatus that is integrated into the device. A user can programmatically control what content is displayed on the marking apparatus. Traditionally, device marking has been accomplished by 'writing' on the device with an engraving tool or other manual technique. Such manual techniques are time consuming. Further, these manual techniques can produce less than satisfying results, such as if the user slips or otherwise makes an illegible letter. In contrast, programmatic control of the marking apparatus can allow the user to review the content before the content is presented on the marking device.

Stated another way, it is a common practice for schools, businesses, or other entities to apply a non-removable text on organization-owned equipment including laptops, phones, tablets, etc. Usually this text is applied manually, such as mechanically with a vibrating engraving tool or by laser etching on a suitable metal or plastic surface. When an entity needs to deploy hundreds or thousands of new devices, etching consumes significant amounts of time and money that can be spent elsewhere. The present concepts provide marking apparatuses that can be integrated into an external surface of a consumer device, and receive an instruction to display a static image that, once set, is displayed for the entire lifetime of this device. Thus, programmatically controlled marking can be performed during the initial configuration of an operating system (and/or at other times), without requiring the expensive and time consuming process of mechanical or laser etching the devices one by one.

Figure 1:
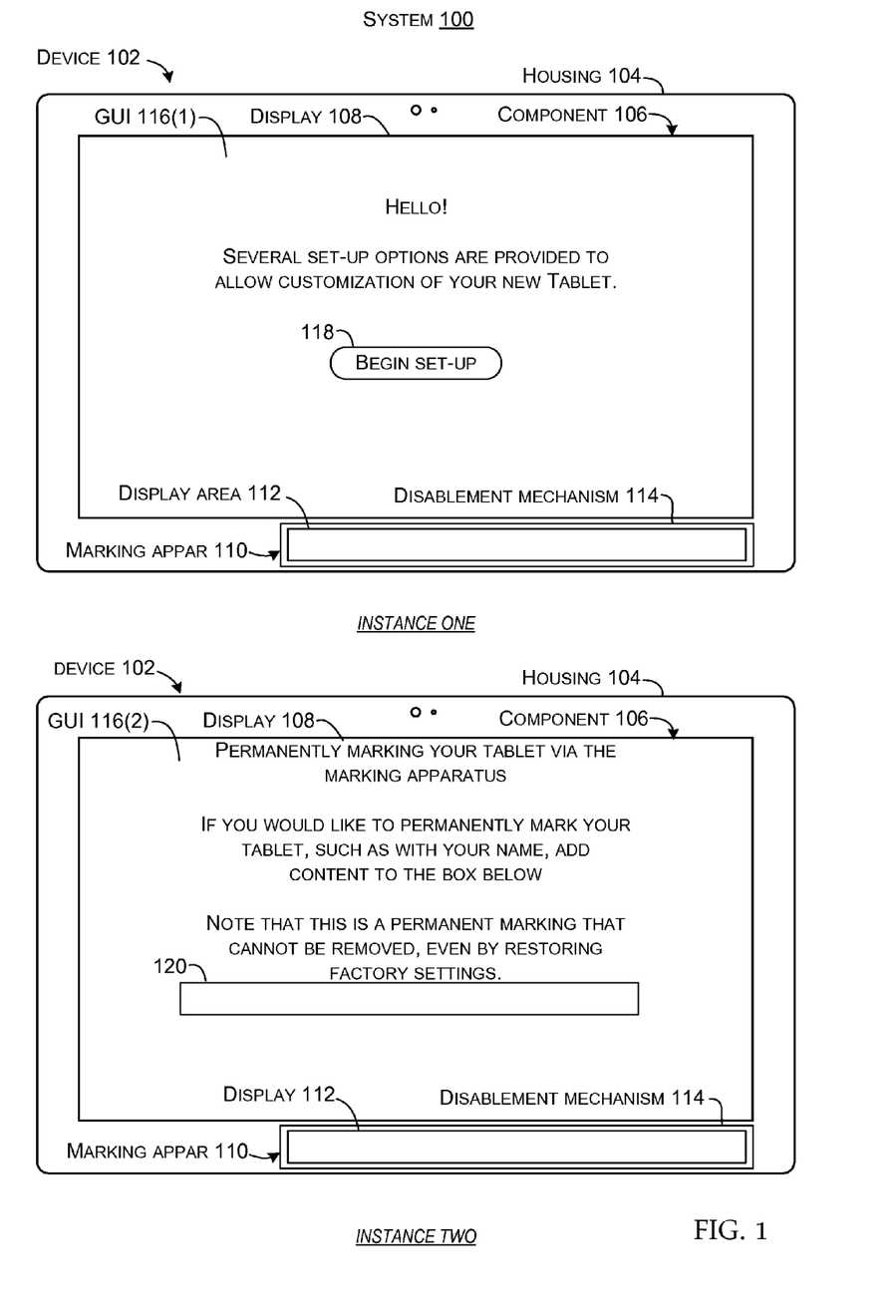
FIGS. 1-8 show example marking apparatus use case scenarios in accordance with some implementations of the present concepts.
Figure 2:
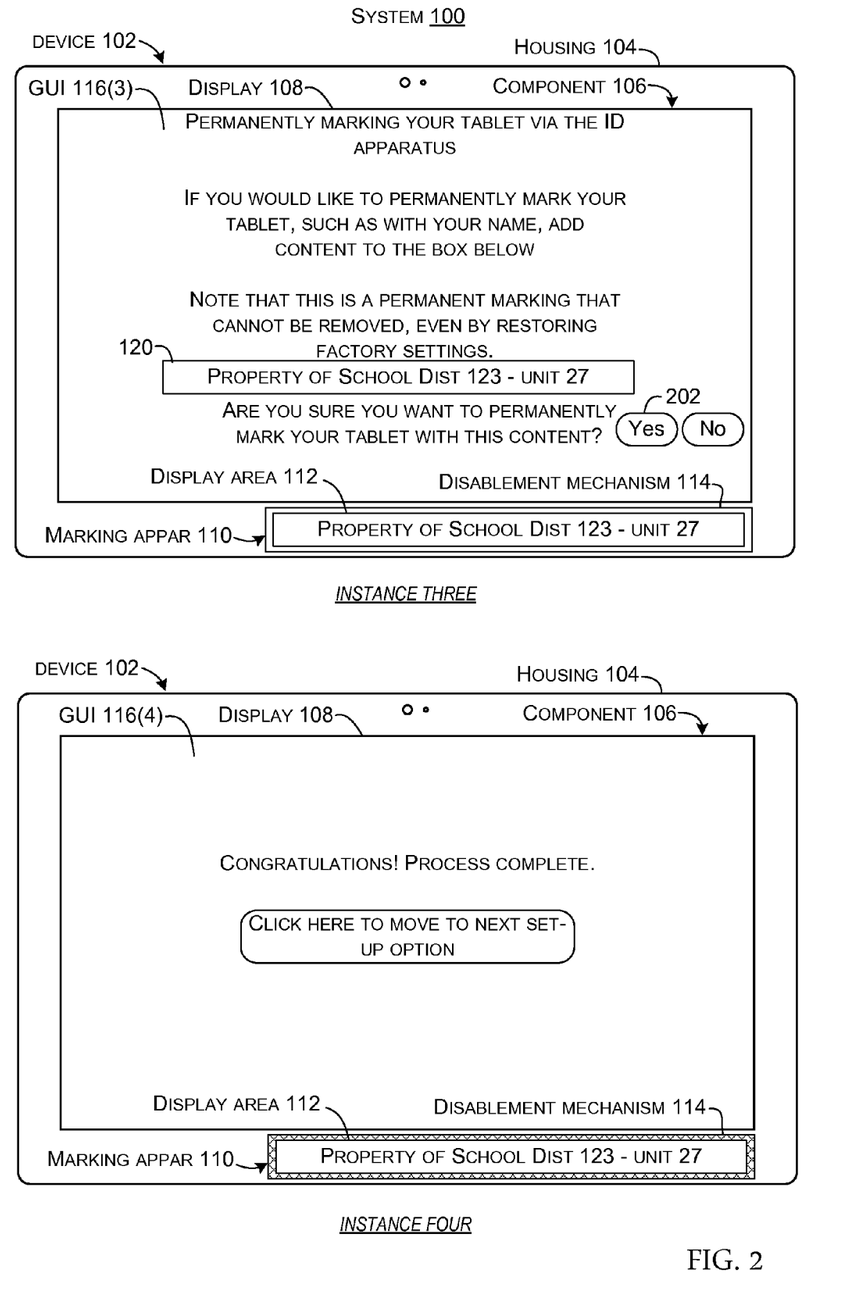

FIGS. 1-2 collectively illustrate a controllable marking use case scenario explained relative to system 100 that includes device 102. In this example device 102 is manifest as a tablet type computing device, but the present concepts can be applied to many types of devices. In this case, the device 102 can include a housing 104 and an element/component 106 positioned relative to the housing. The housing can be a structural component of the device and/or a surface material of the device and/or an externally visible material of the device. In this case, the component 106 is manifest as a display 108. Other example components 106 are described below relative to FIG. 8. Device 102 can also include a controllable marking apparatus 110 (hereinafter, "marking apparatus"). The marking apparatus 110 can be integrated into the housing. For instance, the marking apparatus can be integrated into the housing during device manufacture in such a manner that the marking apparatus 110 cannot be easily removed from the housing and/or removal of the marking apparatus would damage the housing and be readily apparent. Alternatively or additionally, the marking apparatus could be integrated into the device in a manner so that removal of the marking device disables the device. For instance, a power supply wire of the device could be run through the marking apparatus so that removal of the marking apparatus disconnects the power supply (e.g., to the processor etc.). An alternative example can entail storing a value, such as an encrypted key on the marking device. The device can query the marking apparatus for the value, such as at device start-up and/or periodically. If no value or an incorrect value is returned, the device can limit its functionality. For example, the device may shut down or take other action.

The marking apparatus 110 can include a display 112 and a disablement mechanism 114. The display and the disablement mechanism are described in more detail below. Briefly, the display 112 can be programmatically controlled to permanently present user-defined content. The disablement mechanism 114 can function to ensure that the content, once presented on the display, cannot be deleted or changed. Stated another way, the disablement mechanism 114 can have a first state and a second state. In the first state the display 112 is controllable to allow content presented on the display to be programmatically defined. When the disablement mechanism is transitioned to the second state the content is persisted and unchangeable on the display.

Starting with FIG. 1, Instance One shows a use case scenario where a user initially powers-up device 102. In this case, the user may be an end use user (e.g., consumer) or the user may be someone who has authorization to set up the device. In this case, for purposes of explanation, assume that the user is an information technology (IT) person of School District 123 that purchased the device. For instance, the school district might have purchased 100 of the devices and the IT person is authorized to set them up and get them ready for use. (Note that the present concepts are not limited to particular use case scenarios which are included for purposes of explanation. For instance, in another example, the user, such as an end user, could utilize the controllable marking feature after initial power-up of the device).

Instance One shows an initial graphical user interface (GUI) 116(1) presented on display 108. This GUI can facilitate the set-up and customization of the device 102. In this example, the GUI can be generated by the device's operating system that is communicatively coupled to the marking apparatus. Device operating systems are described in more detail below relative to FIG. 8. At this point, the marking apparatus' disablement mechanism 114 is in the first state so content can be displayed on the marking apparatus, not displayed on the marking apparatus, and/or the content can be changed. Assume that the user clicks the "begin set-up" box at 118 to proceed to Instance Two.

Instance Two shows a subsequent GUI 116(2) relating to permanently marking the device 102 via the marking apparatus 110. The user can enter the content they want displayed via input box 120 on the GUI 116(2). In this configuration, the entered content can appear both on input box 120 and display 112 of the marking apparatus 110. Note that the disablement mechanism 114 remains in the first state.

In FIG. 2, Instance Three shows a subsequent GUI 116(3) where the user has entered "Property of School District 123—unit 27" in input box 120. In this implementation, the content appears on both input box 120 and the display 112 of the marking apparatus 110. This configuration can allow the user to preview how the content will actually appear on the marking apparatus 110 before finalizing. (In other configurations, content may be previewed on the GUI, but only sent to the marking apparatus after user approval). In this case, the user can click "Yes" at 202 to make the displayed content permanent on the marking apparatus 110.

Instance Four shows GUI 116(4). At this point, the marking apparatus 110 is illustrated after the user has selected to make the presented content permanent on the display 112. The disablement mechanism 114 has transitioned from the first state to the second state (represented by cross-hatching) and thus the displayed content cannot be changed or removed from the marking apparatus 110. Example disablement mechanisms are described below relative to FIGS. 4-5 and 8-9. Briefly, the disablement mechanism may be a distinct component, such as a fuse that once blown prevents programmatic control of the marking apparatus. In other cases, the disablement mechanism may be a property of the display itself, such as a chemical reaction, so that once the state of the display changes content cannot be changed or removed on the marking apparatus.

Note also that FIGS. 1-2 show a configuration where GUIs are generated on the device that guide the user through the process of defining what content he/she wants permanently presented on the device's marking apparatus. Other implementations can employ a centralized management solution that applies policies and settings to the device. These policies and settings can include the content for permanent presentation on the marking apparatus. Alternatively, policies and settings can include instructions for how to dynamically generate that content on the device (e.g. a marking based on a prefix+serial number). For instance, the school district could receive their 100 devices and centralized management code (e.g., computer-readable instructions) that when run on the devices automatically defines the content for permanent presentation on the marking apparatus.

Figure 3:
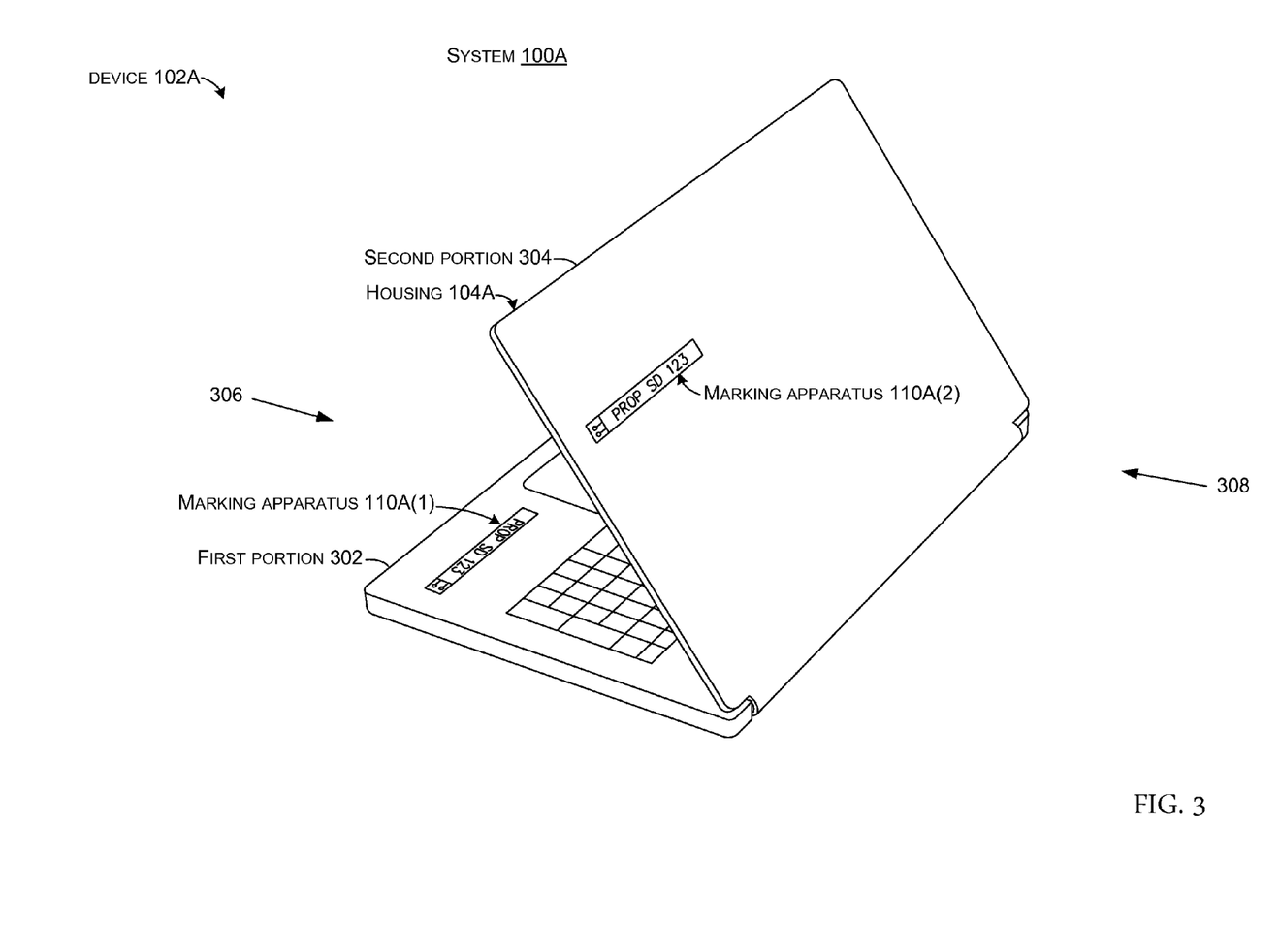

FIG. 3 illustrates another controllable marking use case scenario explained relative to system 100A that includes device 102A. In this example, device 102A is manifest as a notebook/laptop type computing device, but can be applied to many types of devices. The device 102A can include housing 104A. The device 102A can include first and second portions 302 and 304. This particular implementation includes an instance of the marking apparatus 110A(1) on the first portion 302 and another instance of the marking apparatus 110A(2) on the second portion 304. In this implementation, marking apparatus 110A(1) is visible from a user position looking at device 102A along arrow 306, and marking apparatus 110A(2) is visible from a backside of the notebook computer as indicated by arrow 308. In this implementation the user can specify the content to be presented on both marking apparatuses 110A(1) and 110A(2) in a similar manner to that described above relative to FIGS. 1-2 except that a single procedure can be used to control both marking apparatuses 110A (e.g. same content displayed on both) or the marking apparatuses can be independently controlled (e.g., different content can be defined for presentation on the two marking apparatuses 110A(1) and 110A(2)).

In this implementation, the marking apparatuses 110A(1) and 110A(2) clearly mark the device 102A in a manner that is readily apparent to the user and to passersby. This configuration can further discourage attempts to steal the device since concealment of both marking apparatuses is difficult.

Further in the case of device configurations where the first and second portions are physically separable, such as in the case of a notebook computer that can transition into a tablet (e.g., second portion 304) and a keyboard (e.g., first portion 302), both portions are marked to reduce loss and/or mispairing (e.g., attempting to recombine first and second portions from different devices).

Figure 4:
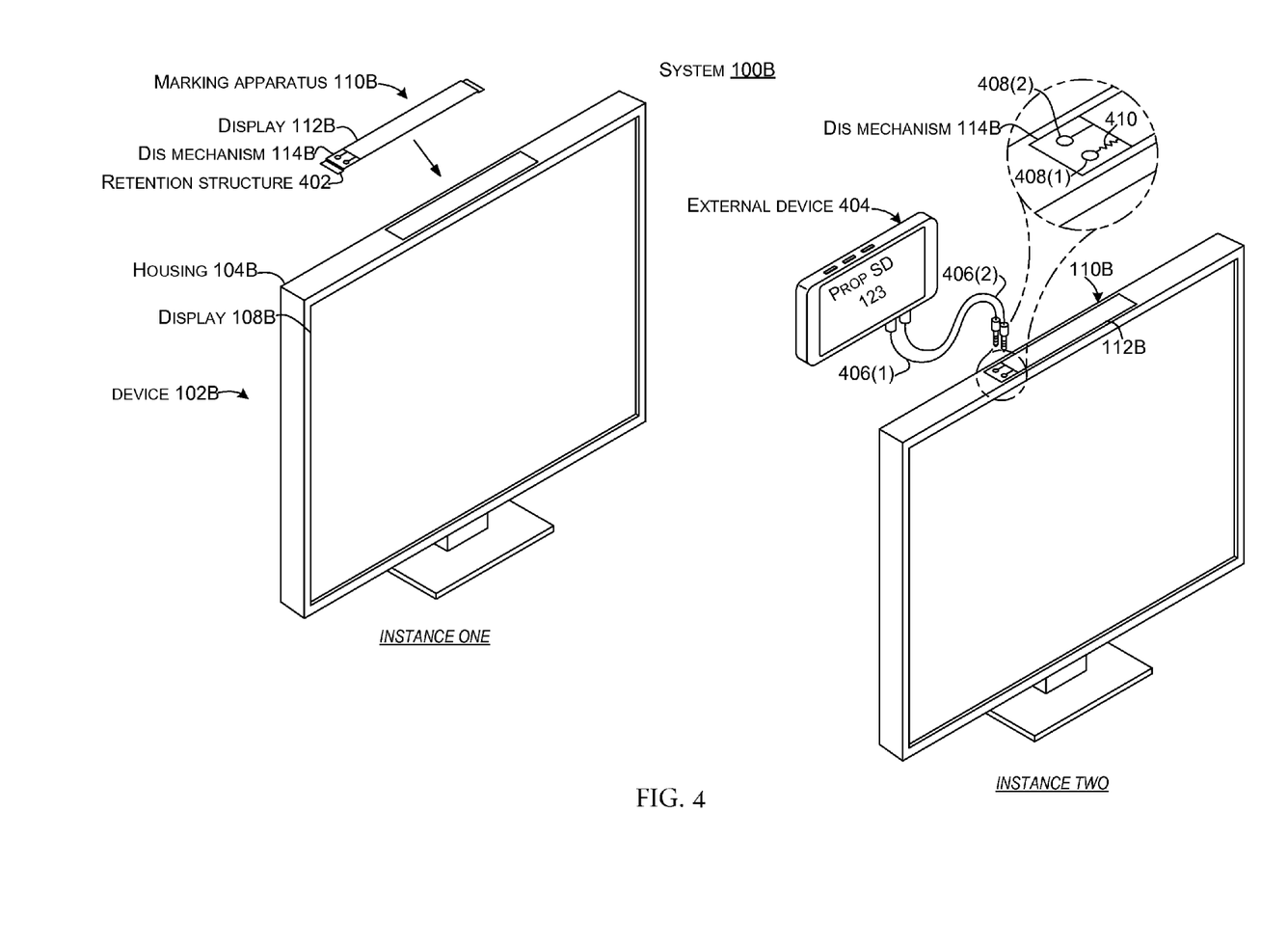
Figure 5:
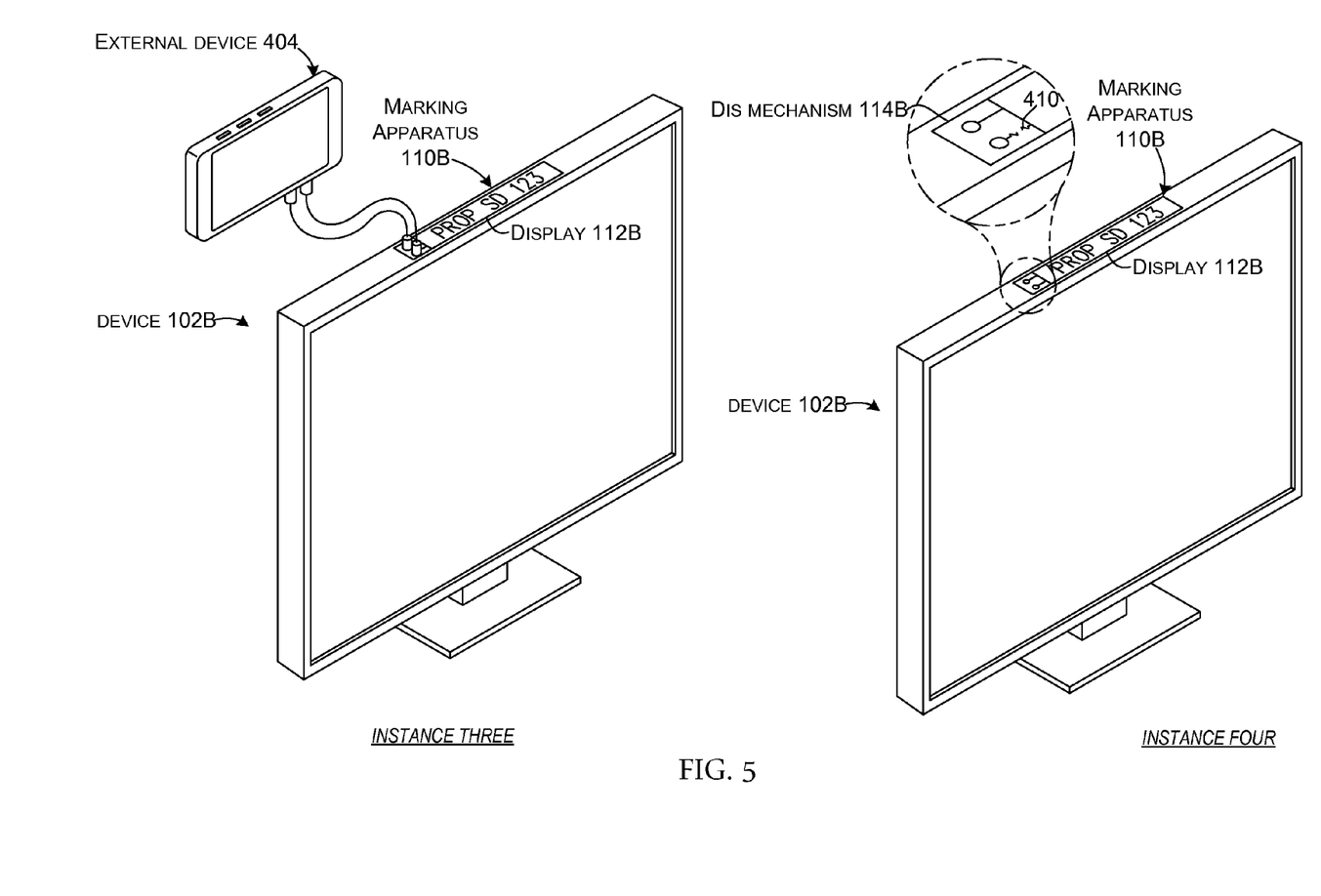

FIGS. 4-5 relate to another system 100B that includes device 102B manifest as a monitor/TV. Starting at Instance One, the device 102B includes housing 104B with marking apparatus 110B integrated into the housing. In this case, the marking apparatus 110B has retention structures 402 manifest as flanges that extend under the housing. These retention structures can make it more difficult to remove the marking apparatus 110B from the housing 104B. In this example, the marking apparatus 110B can also include display 112B and disablement mechanism 114B.

The marking apparatus 110B is programmatically controllable in a similar manner to marking apparatus 110 of FIG. 1. However, in this case, the marking apparatus is programmatically controllable by an external device 404 as evidenced in Instance Two. In this case, the external device 404 can be manifest as a controller that can be physically connected to the marking apparatus 110B to deliver electronic signals to programmatically control the marking apparatus. In this example, the external device 404 can be connected to the marking apparatus 110B via two leads 406(1) and 406(2) that connect to two ports or receptacles 408(1) and 408(2). In this implementation, the disablement mechanism 114B includes a fuse 410 between the port 408(1) and the display 112B.

As evidenced at Instance Two, in this configuration, an authorized user can cause content from the external device 404 to be delivered to the marking apparatus 110B for presentation on display 112B. In this example, as displayed on the external device 404, this content is "Prop SD 123."

At Instance Three, FIG. 5 shows the content (e.g., Prop SD 123) delivered from the external device 404 to the marking apparatus 110B and presented on display 112B. The external device can then take an additional action to cause the disablement mechanism 114B to transition to a second state that prevents content delivery to the display 112B. As mentioned, in this example the disablement mechanism 114B can include fuse 410. The fuse can be selected to allow content delivery to the display 112B via the electronic signals at a power below a threshold power level as evidenced at Instance Three.

However, once the content is delivered, the external device 404 can deliver a power spike at a higher level that exceeds the threshold power level to blow the fuse 410 as shown at Instance Four. At this point, the disablement mechanism 114B prevents further modification to the displayed content on the marking apparatus 110B.

Figure 6:
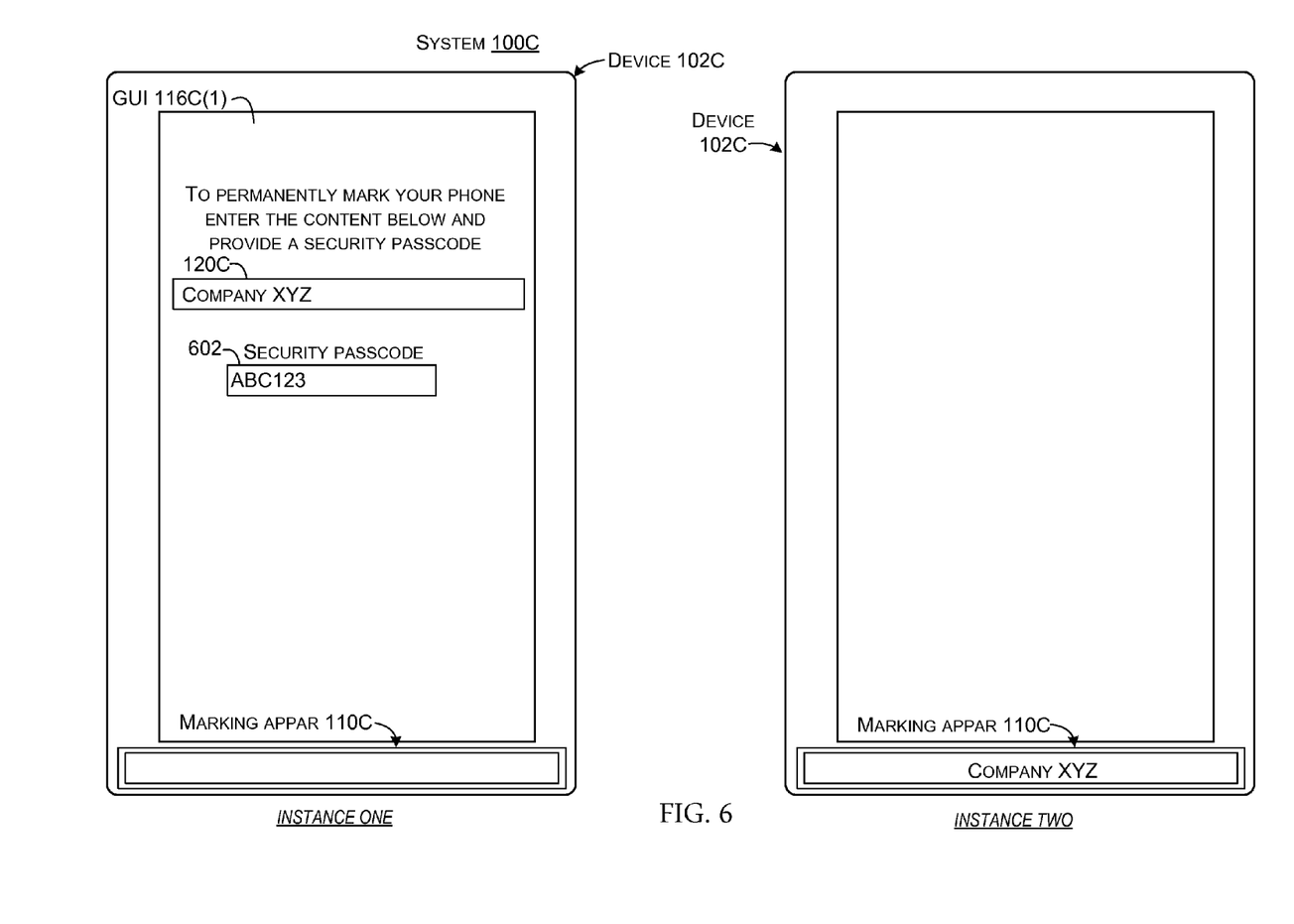
Figure 7:
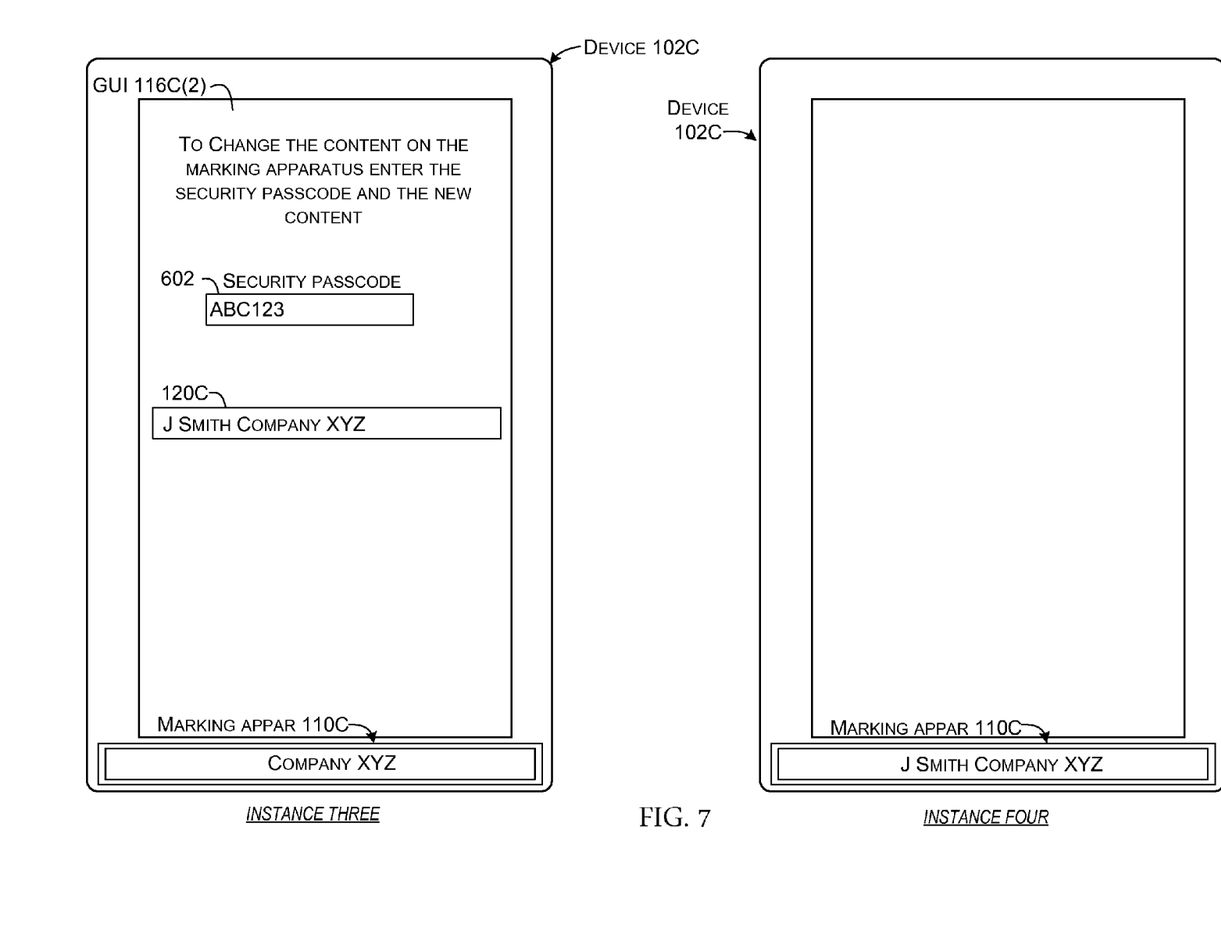

FIGS. 1-5 illustrate configurations where the marking apparatus 110 is programmatically controllable by the user to define what content is presented on the marking apparatus. Once content is displayed and the disablement mechanism 114 changes states, the presented content is permanent and can never be changed. FIGS. 6-7 describe an alternative configuration where content displayed on the marking apparatus is protected by a unique ID (e.g., passcode protected) but can be changed at a subsequent time by a user in possession of the unique ID.

FIGS. 6-7 collectively show another system 100C and device 102C that includes marking apparatus 110C. As evidenced on GUI 116C(1) of Instance One of FIG. 6, the user can enter content in the input box 120C for marking apparatus 110C. The user can also provide a marking apparatus security passcode at 602 that relates to the marking apparatus. In this example, the user entered content is "Company XYZ" and the marking apparatus security passcode is "ABC123." Instance Two shows the content presented on the marking apparatus 110C.

Instance Three of FIG. 7 shows a subsequent point where the user wants to change the content on the marking apparatus 110C. GUI 116C(2) instructs the user to supply the matching passcode, which in this case is "ABC123." The user can then change the content presented on the marking apparatus by using input box 120C. In this example, as evidenced in Instance Four, the user changes the content on the marking apparatus 110C to "J Smith Company XYZ."

Viewed from one perspective, in this implementation, the content is permanently presented on the marking apparatus 110C unless changed by a user in possession of the marking apparatus security passcode. The user can subsequently change content presented on the marking apparatus by using the marking apparatus security passcode. Note however, that security of the marking apparatus as represented by the marking apparatus security passcode can be maintained separately and distinctly from other aspects of the device 102C, such as the operating system and/or factory settings, such that the marking apparatus security passcode cannot be circumvented by resetting the device to factory settings.

Figure 8:
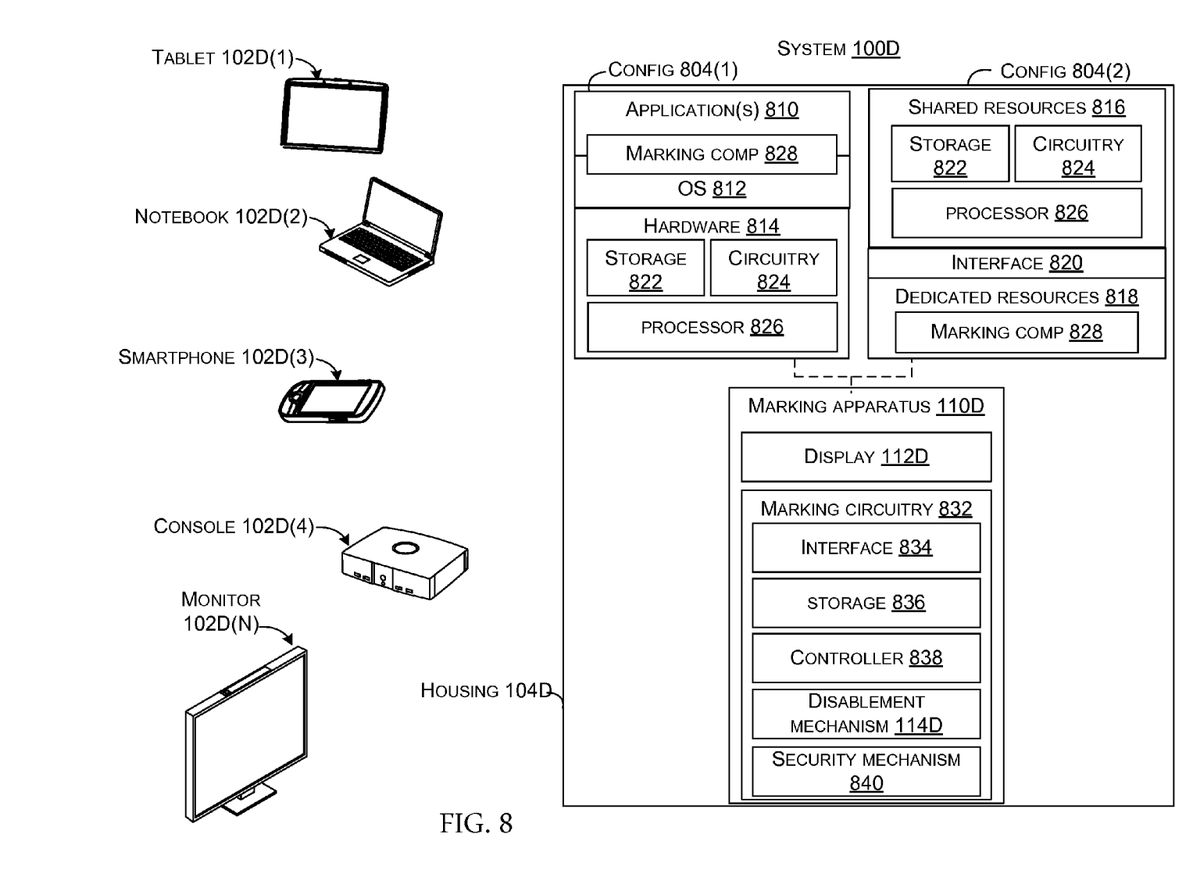

FIG. 8 shows a system 100D and example devices 102D that can employ marking apparatuses 110D. System 100D illustrates example elements that can be employed on devices 102D and example elements of marking apparatus' that can be employed on the devices.

Example devices 102D include tablet type device 102D(1), notebook type device 102D(2), smartphone type device 102D(3), entertainment console 102D(4), and monitor 102D(N) (the "N" suffix is used here to indicate that the present concepts can be applied to endless types of existing, developing, or yet to be developed types of devices). Several of these devices are similar to the devices introduced in the examples above relative to FIGS. 1-7. The devices can also include external device 404 described above relative to FIG. 4.

Two example device configurations 804(1) and 804(2) are illustrated that can be used to implement devices 102D. Either of these device configurations can be paired with marking apparatus 110D integrated into housing 104D.

Briefly, configuration 804(1) represents an operating system centric configuration, and configuration 804(2) represents a system on a chip configuration (SOC). Configuration 804(1) is organized into one or more applications 810, operating system 812, and hardware 814. Configuration 804(2) is organized into shared resources 816, dedicated resources 818, and an interface 820 therebetween.

In either configuration 804(1) or 804(2), device 102D can include storage/memory (e.g., computer-readable storage media) 822, circuitry 824, a processor 826, and/or a marking component 828.

The marking apparatus 110D can include display 112D and marking circuitry 832. The marking circuitry 832 can include an interface 834, storage 836, controller 838, disablement mechanism 114D and/or security mechanism 840.

Interface 834 can be manifest in various forms to allow communications between the marking apparatus 110D and internal components of the device 102D and/or external devices (404, FIG. 4). In the internal context, the interface could be an ASCI, serial, or USB bus, among others. These versions could also be used in the external context or another configuration could be used, such as ports (408, FIG. 4). The communication enabled by the interface 834 can allow the marking component 828 to generate the GUIs (116, FIGS. 1, 2, 6, and 7) that allow an authorized user to define content to be presented on the marking apparatus 110D.

Operating system centric configuration 804(1) offers several options for implementing the marking component 828. First, the marking component 828 can be manifest as part of the operating system 812, as application 810, and/or application part of application 810. Alternatively, the marking component 828 can be manifest as firmware and/or on hardware 814, such as on circuitry 824, which can include application specific integrated circuits (ASICs), field programmable gate arrays (FPGAs), and/or other circuitry, such as hardware processor 826.

The marking apparatus' display 112D can be manifest in several different forms. Examples are described below relative to FIG. 9.

Marking circuitry 832 can be manifest in various ways. In one case, the marking circuitry can include an FPGA or an ASIC that is configured to drive the display 112D. The display and the marking circuitry can be integrated into a single secure component that can be integrated into the device housing 104D.

Storage 836 can be manifest as storage, non-volatile memory, etc. In one case, the storage 836 is provided by the security mechanism 840. In other cases, the security mechanism can be manifest in different form factors. In one case, the security mechanism can be a trusted platform module (TPM) that can securely store the passcode for the marking apparatus 110D and compare any subsequent user supplied passcode to the passcode stored in the TPM before allowing any changes to the content presented on display 112D. Only in the case of a match does the TPM allow controller 838 to execute instructions to control content presentation on the display 112D.

As mentioned above, configuration 804(2) is considered to be a system on a chip (SOC) type design. In such a case, functionality provided by the device 102D can be integrated on a single SOC or multiple coupled SOCs. One or more processors 826 can be configured to coordinate with other shared resources 816, such as memory/storage 822, etc., and/or one or more dedicated resources 818, such as hardware blocks configured to perform certain specific functionality. Thus, the term "processor" as used herein can also refer to central processing units (CPUs), graphical processing units (CPUs), controllers, microcontrollers, microprocessor, processor cores, or other types of processing devices. Similarly, the marking apparatus 110D can be implemented in a SOC configuration as one or more chips. For example, the marking apparatus 110D can be manifest as controller 838, an ASIC, or a FPGA, among other configurations.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage that can be internal or external to the computer. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, non-volatile memory, and/or flash memory, among others.

Figure 9:
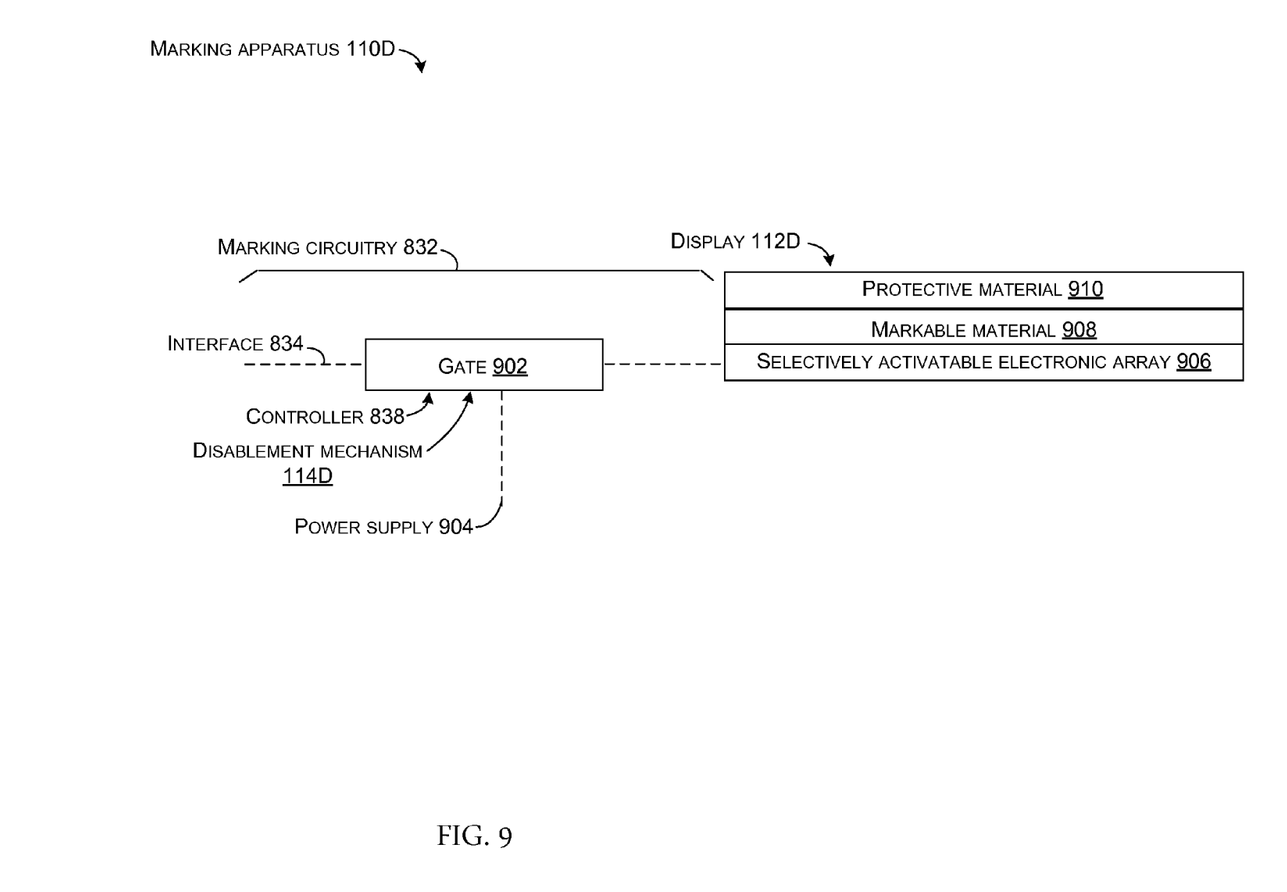
FIG. 9 shows details of one marking apparatus in accordance with some implementations of the present concepts.

FIG. 9 shows details of example implementations of marking apparatus 110D. This example shows the interface 834 electrically connected to controller 838 which is in turn electrically connected in a controlling relationship to the display 112D. In this case, the controller 838 is manifest as a gate 902. As mentioned above relative to FIG. 8, the controller could alternatively be manifest as a processor, microcontroller, ASIC, or FPGA, among others. The controller can receive content from the interface and power from the power supply 904 to selectively drive the display 112D.

In this example, the display 112D includes a selectively activatable electronic array 906, such as a thin film transistor (TFT) layer. From one perspective, the selectively activatable electronic array 906 can be viewed as a controllable array of electrical conductors. In this case, the selectively activatable electronic array 906 is positioned under a markable material 908 which is overlaid by a protective material 910. The gate 902 can activate specific regions (e.g., resistor or transistors) of the selectively activatable electronic array 906 in a pattern defined by the content received from the interface 834. The activated specific regions can influence overlying regions of the markable material to cause a visible change to those regions relative to other regions to present the content. A viewer looking through the protective material 910 can see the content presented as differences between influenced and non-influenced regions.

Various markable material 908 implementations can be employed. In one example, the markable material can employ color change properties of a chemical compound layer, such as color change/redox properties of transition metals, to cause visible differences between the influenced regions/portions and the non-influenced regions. In this implementation, when voltage is applied, oxidation/reduction occurs in the overlying influenced regions resulting in a color change. For instance, the markable material could include Titanium Dioxide which can transition to Titanium Trioxide (e.g., $TiO_2 \rightarrow TiO_3$) when influenced by the selectively activatable electronic array 906. Other examples can include Potassium Permanganate ($KMnO_4$)→Potassium Manganite ($KMnO_2$) and compounds of Chromium (Cr), Manganese (Mn), Copper (Cu) or Vanadium (V). Another example markable material can include a solution of Sodium Iodide (NaI) and starch where application of voltage can produce a blue color change. In other implementations, the overlying influenced regions can undergo a phase change that produces visible results.

Another implementation can utilize etching to produce the visible differences between the influenced regions and the non-influenced regions. In one such case, the markable material can be manifest as cells of etch chemicals (e.g. solvent) of material positioned against a membrane layer. Selectively applying voltage to selectively activatable electronic array 906 can heat the cells and cause the etch chemicals to be released onto the membrane layer. This can etch the membrane layer causing visual differences between etched and not etched regions. In one such example, the etch chemical can be Acetone and the membrane layer can be plastic film.

Another implementation can configure the selectively activatable electronic array 906 to create magnetic fields. The markable material 908 can be manifest as Iron ($Fe^{3+}$) dispersed in a film. Applying voltage to the selectively activatable electronic array can create small magnetic fields that move/align the $Fe^{3+}$ in the film resulting in image generation (e.g., presenting the content on the display 112D). In some configurations, the film can be cured with heat from the selectively activatable electronic array to ensure that the process is not reversible (e.g., to function as the disablement mechanism 114D). Similarly, other implementations can induce a catalyst to lock in the chemical change to prevent reversibility. For instance, one such implementation may cure the polymer film with a catalyst to ensure that the process is not reversible. Another implementation can involve e-ink technologies in the markable material 908. The selectively activatable electronic array 906 can activate individual cells of the e-ink and can cause a binder to be released that prevents the e-ink from further state changes.

As mentioned above relative to FIGS. 4-5 and 8, other implementations can rely on the marking circuitry 832 to provide the disablement mechanism 114D. For instance, once the image of the content has been generated on the display 112D, the circuit can either be shut off, for example by a blown fuse (FIGS. 4-5), or by tripping a field effect transistor (FET). In one such implementation, gate 902 may include instructions to, after having driven the selectively activatable electronic array 906, destroy all or part of its circuitry to avoid further modifications of the displayed content. Thus, the gate 902 can function as the disablement mechanism.

From one perspective, the present implementations can provide a display that can be thought of as a controllable matrix of cells that can be integrated into an electronic device. The controllable matrix of cells can receive commands from the device operating system, marking circuitry, or an external device to display content (e.g., specified image or text). When such a command is received, the selectively activatable electronic array 906 modifies individual cells of the controllable matrix of cells in such a way that it can no longer change its state, thus making the displayed image permanent. Thus, such implementations are permanent in nature and content cannot be changed.

An alternative configuration was introduced above relative to FIGS. 6-7. In this implementation, the marking apparatus 110C can be instructed to display content and to protect the displayed content with a passcode. The marking apparatus will only modify the content if subsequent instructions provide a matching passcode (e.g., are digitally signed with a specific key or a specified pre-shared key is presented with the instruction). The term passcode is intended to cover simple alphanumeric passcodes, certificate authentications, hashed passcodes, encrypted keys, and/or biometric passcodes, among others. Such a passcode protected configuration can allow many display technologies, such as LED, OLED, etc. to be employed for the display 112D. In some of these configurations, the content presented on the display 112D is permanent, but only visible when the device is powered on. In other implementations, the content can be visible on the display device whether the device is powered on or powered off.

Example Methods

Figure 10:
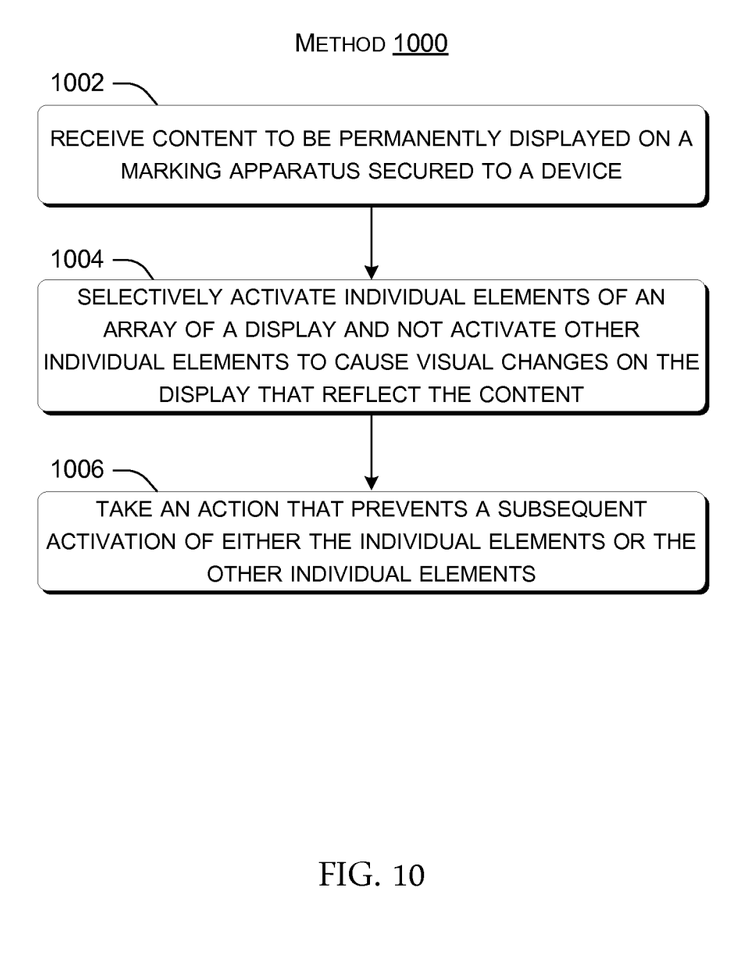
FIG. 10 shows an example flow chart in accordance with some implementations of the present concepts.

FIG. 10 illustrates a flowchart of a method or process 1000 that is consistent with at least some implementations of the present concepts.

At block 1002, the method can receive content to be permanently displayed on a marking apparatus secured to a device.

At block 1004, the method can selectively activate individual elements of an array of a display and not activate other individual elements to cause visual changes on the display that reflect the content.

At block 1006, the method can take an action that prevents a subsequent activation of either the individual elements or the other individual elements.

The described methods or processes can be performed by the systems and/or devices described above, and/or by other devices and/or systems. The order in which the methods are described is not intended to be construed as a limitation, and any number of the described acts can be combined in any order to implement the method, or an alternate method. Furthermore, the method can be implemented in any suitable hardware, such as circuitry, software, firmware, or combination thereof, such that a device can implement the method. In one case, the method is stored on computer-readable storage media as a set of instructions such that execution by a processor of a computer device causes the computer device to perform the method.

Further Examples

One example can include a system, comprising a device that includes a housing and a marking apparatus integrated into the housing. The marking apparatus includes a display and a disablement mechanism, and while the disablement mechanism is in a first state, the display is controllable to allow content presented on the display to be defined. When the disablement mechanism is transitioned to a second state, the content is persisted and unchangeable on the display.

Another example can include any combination of the above and/or below examples where the display comprises a layer of a chemical compound positioned over a controllable array of electrical conductors.

Another example can include any combination of the above and/or below examples where the selectively activatable electronic array comprises a thin film transistor layer.

Another example can include any combination of the above and/or below examples where the display comprises the disablement mechanism.

Another example can include any combination of the above and/or below examples where the display is configured to undergo a non-reversible change when transitioned to the second state that provides the disablement mechanism.

Another example can include any combination of the above and/or below examples where the display comprises a layer of transition metals.

Another example can include any combination of the above and/or below examples where the content is presented on the display by causing an oxidation/reduction reaction on individual portions of the layer of transition metals that causes color changes to the individual portions.

Another example can include any combination of the above and/or below examples where the display comprises a layer of Sodium Iodide.

Another example can include any combination of the above and/or below examples where the display comprises an array of cells of solvent positioned against a membrane layer.

Another example can include any combination of the above and/or below examples where the solvent comprises acetone and the membrane layer comprises a plastic layer.

Another example can include any combination of the above and/or below examples where the non-reversible change comprises a phase change or an oxidation/reduction reaction.

Another example can include any combination of the above and/or below examples where the marking apparatus further comprises circuitry for controlling the display.

Another example can include any combination of the above and/or below examples where the circuitry comprises the disablement mechanism.

Another example can include any combination of the above and/or below examples where the circuitry includes a fuse that allows the display to be driven below a threshold power level and which can be blown with a spike of power above the threshold power level to transition the disablement mechanism to the second state.

Another example can include any combination of the above and/or below examples where the circuitry includes a controller and where the controller is configured to self-destruct after controlling the display.

Another example can include any combination of the above and/or below examples where the controller comprises a gate or wherein the controller comprises a microprocessor.

Another example can include a device, comprising a housing and a marking apparatus integrated into the housing. The marking apparatus is configured to allow an entity to electronically define content for presentation on the marking apparatus. Upon displaying the content, the marking apparatus is configured to undergo a transformation that causes the content to be unchangeable.

Another example can include any combination of the above and/or below examples where the device includes a processor and a display, and where the processor is configured to present a graphical user interface on the display that allows the entity to electronically define the content for presentation on the marking apparatus.

Another example can include any combination of the above and/or below examples where the marking apparatus is configured to be physically coupled to an external device through which the entity can electronically define the content for presentation on the marking apparatus.

Another example can include a device, comprising a processor and storage positioned in a housing, and a marking apparatus integrated into an external surface of the housing. The marking apparatus is configured to persistently display content that is protected with a passcode. The marking apparatus includes a security mechanism for storing the passcode that is separate and distinct from the processor and the storage. The security mechanism only allows the content to be changed in an instance where a supplied passcode matches the stored passcode.

Another example can include any combination of the above and/or below examples where the content is persistently displayed whether the device is in a powered on state or a powered off state, or where the content is persistently displayed only when the device is in a powered on state.

Another example can include any combination of the above and/or below examples where the security mechanism comprises a trusted platform module (TPM) that is dedicated to the marking apparatus.

Another example can include any combination of the above and/or below examples where the passcode is a simple alphanumeric passcode, or wherein the passcode is a certificate authentication, or wherein the passcode is hashed, or wherein the passcode is an encrypted key.

Conclusion

Although techniques, methods, devices, systems, etc., pertaining to controllable marking are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc. Also, as used herein, 'including' means 'including but not limited to,' 'based on' means 'based at least in part on,' and 'a' means 'one or more.' Also, if interpretation under Section 112 6/f is intended the phrase 'means' or 'step' will be employed. Lacking one of these two explicit recitations, Section 112 6/f is not intended to be invoked.

The invention claimed is:

1. A system, comprising:
   a device comprising a housing;
   a first display;
   a processor configured to control presentation of first content on the first display; and
   a marking apparatus integrated into the housing, the marking apparatus including:
   a second display; and
   a disablement mechanism having a first state and a second state,
   wherein, while the disablement mechanism is in the first state, the disablement mechanism allows the processor to define second content to be presented on the second display, and
   wherein, when the disablement mechanism is transitioned to the second state, the disablement mechanism causes the second display to undergo a non-reversible change where the second content is persisted and unchangeable on the second display while the processor continues to control the presentation of the first content on the first display.

2. The system of claim 1, wherein the second display comprises a layer of a chemical compound positioned over a controllable array of electrical conductors.

3. The system of claim 2, wherein the controllable array comprises a thin film transistor layer.

4. The system of claim 1, wherein the second display comprises the disablement mechanism.

5. The system of claim 1, wherein the processor is configured to:
   receive user input specifying the second content;
   receive further user input confirming the second content; and
   responsive to the further user input, cause the disablement mechanism to transition to the second state.

6. The system of claim 1, wherein the second display includes a layer comprising transition metals.

7. The system of claim 6, wherein the second content is presented on the second display by causing an oxidation/reduction reaction on individual portions of the layer that causes color changes to the individual portions.

8. The system of claim 1, wherein the second display comprises a layer of sodium iodide.

9. The system of claim 1, wherein the second display comprises an array of cells of solvent positioned against a membrane layer.

10. The system of claim 9, wherein the solvent comprises acetone and the membrane layer comprises a plastic layer.

11. The system of claim 1, wherein the non-reversible change comprises a phase change or an oxidation/reduction reaction.

12. The system of claim 1, wherein the marking apparatus further comprises circuitry for controlling the second display.

13. The system of claim 12, wherein the circuitry comprises the disablement mechanism.

14. The system of claim 13, wherein the circuitry includes a fuse that allows the second display to be driven below a threshold power level and which can be blown with a spike of power above the threshold power level to transition the disablement mechanism to the second state.

15. The system of claim 13, wherein the circuitry includes a controller and wherein the controller is configured to self-destruct after controlling the second display.

16. The system of claim 15, wherein the controller comprises a gate or wherein the controller comprises a microprocessor.

17. A method comprising:
   displaying first content on a first display area of a device;
   displaying second content on a second display area of the device; and
   responsive to user input to the device, causing a physical modification to the device that permanently prevents modification of the second content on the second display area while allowing the first content in the first display area of the device to be modified.

18. The method of claim 17, the device comprising a tablet, laptop, or phone.

19. The method of claim 18, the tablet, laptop, or phone comprising a first display providing the first display area and a second display providing the second display area.

20. A device comprising:
   one or more displays providing a first display area and a second display area;
   a processor configured to control presentation of first content in the first display area; and
   a marking apparatus configured to control presentation of second content in the second display area,
   the marking apparatus comprising a disablement mechanism configured to cause a physical modification to the device that prevents subsequent modification of the second content in the second display area while allowing the processor to retain control of the presentation of the first content in the first display area.

21. The device of claim 20, the one or more displays including a first display providing the first display area and a second display providing the second display area.

22. The device of claim 21, the physical modification comprising permanently interrupting a circuit, wherein, prior to the interrupting of the circuit, the processor is capable of modifying the second content via the circuit, and after interrupting the circuit, the processor is prevented from modifying the second content.

23. The device of claim 22, the physical modification comprising causing a fuse to blow.

24. The device of claim 20, the processor being configured to provide an operating system of the device, the operating system being configured to:
- control the presentation of the first content in the first display area; and
- prior to the physical modification, provide the second content to the marking apparatus.

* * * * *